US010160487B1

(12) United States Patent
Ogawa et al.

(10) Patent No.: US 10,160,487 B1
(45) Date of Patent: Dec. 25, 2018

(54) DUMP TRUCK

(71) Applicant: Komatsu Ltd., Tokyo (JP)

(72) Inventors: Yasushi Ogawa, Tokyo (JP); Tomohiro Takano, Tokyo (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 15/564,300

(22) PCT Filed: Jun. 26, 2017

(86) PCT No.: PCT/JP2017/023374
§ 371 (c)(1),
(2) Date: Oct. 4, 2017

(87) PCT Pub. No.: WO2017/213271
PCT Pub. Date: Dec. 14, 2017

(51) Int. Cl.
*B62D 7/18* (2006.01)
*B62D 7/14* (2006.01)
*B62D 5/12* (2006.01)
*B60G 3/20* (2006.01)
*B60P 1/04* (2006.01)
B62D 21/18 (2006.01)

(52) U.S. Cl.
CPC ............ *B62D 7/142* (2013.01); *B60G 3/20* (2013.01); *B60P 1/04* (2013.01); *B62D 5/12* (2013.01); *B62D 7/18* (2013.01); *B60G 2200/144* (2013.01); *B60G 2200/44* (2013.01); *B60G 2300/026* (2013.01); *B60Y 2200/142* (2013.01); *B60Y 2400/84* (2013.01); *B62D 21/186* (2013.01)

(58) Field of Classification Search
CPC . B62D 7/142; B62D 5/12; B62D 7/18; B60G 3/20; B60P 1/04
USPC .......................................................... 180/252
See application file for complete search history.

(56) References Cited

U.S. PATENT DOCUMENTS

| | | | | |
|---|---|---|---|---|
| 1,384,727 A | * | 7/1921 | Hutcheson ................ | G09F 1/10 248/206.3 |
| 2,756,067 A | * | 7/1956 | Porsche .................. | B60G 3/207 267/222 |
| 3,302,957 A | * | 2/1967 | Allen .................. | B62D 53/0878 280/432 |
| 4,229,017 A | * | 10/1980 | Hagedorn .............. | B62D 17/00 280/93.512 |
| 4,491,336 A | * | 1/1985 | Myers ................... | B60T 17/046 137/351 |

(Continued)

FOREIGN PATENT DOCUMENTS

| | | | | |
|---|---|---|---|---|
| CA | 2940421 A1 | * | 9/2015 | ............... B60G 3/20 |
| CN | 203410508 U | | 1/2014 | |

(Continued)

*Primary Examiner* — Jacob D Knutson
(74) *Attorney, Agent, or Firm* — Locke Lord LLP; James E. Armstrong, IV; Nicholas J. DiCeglie, Jr.

(57) ABSTRACT

A dump truck has a the holding mechanism that is provided at a lower part of a king pin and that is for holding the suspension arm from below, and the holding mechanism includes: a snap ring protruded from an outer peripheral surface of the king pin and disposed in a peripheral direction of the king pin; a bolt attached detachably at a lower end of the king pin; and a holder fixed to the king pin by the bolt and having a supported surface opposed to the snap ring from above and along the peripheral direction.

20 Claims, 9 Drawing Sheets

(56) References Cited

U.S. PATENT DOCUMENTS

| | | | | | |
|---|---|---|---|---|---|
| 4,798,394 | A | * | 1/1989 | Pollock | B62D 7/18 280/93.512 |
| 5,709,399 | A | * | 1/1998 | Smith, Jr. | B62D 7/18 280/93.512 |
| 5,803,621 | A | * | 9/1998 | Assmann | B62D 7/18 384/607 |
| 7,503,739 | B2 | * | 3/2009 | Yoo | B62D 7/18 403/295 |
| 8,573,615 | B2 | * | 11/2013 | Kuwabara | B60G 3/06 180/253 |
| 9,211,908 | B2 | * | 12/2015 | Stjernling | B62D 7/18 |
| 2008/0084042 | A1 | * | 4/2008 | Dinakaran | B60G 7/008 280/93.512 |
| 2017/0015352 | A1 | | 1/2017 | Uranaka et al. | |

FOREIGN PATENT DOCUMENTS

| | | | |
|---|---|---|---|
| CN | 204327742 U | 5/2015 | |
| CN | 106029472 A | 10/2016 | |
| JP | 04-119293 A | 4/1992 | |
| JP | 06-039671 U | 5/1994 | |
| JP | 10-009256 A | 1/1998 | |
| JP | 11-227433 A | 8/1999 | |
| JP | 2006-306247 A | 11/2006 | |
| JP | 2008-024052 A | 2/2008 | |
| SU | 1579833 A1 * | 7/1990 | |
| WO | WO-2016001729 A1 * | 1/2016 | B62D 7/18 |

* cited by examiner

DUMP TRUCK

TECHNICAL FIELD OF THE INVENTION

The present invention relates to a dump truck.

DESCRIPTION OF THE RELATED ART

In Patent Document 1, a suspension of the dump truck is disclosed. The suspension has a suspension cylinder whose upper end is connected to an upper part of a vehicle-body frame, and a suspension arm which is connected to a lower part of the vehicle-body frame and which extends toward a vehicle-width outward direction. A lower end of the suspension cylinder and the tip of the suspension arm are connected to each other via a king pin fixed to the lower end of the suspension cylinder. At the lower part of the suspension cylinder, a spindle for supporting tires is connected so as to be rotatable around the axis of the king pin.

PRIOR ART DOCUMENT

Patent Document

[Patent Document 1] Japanese Unexamined Patent Application, First Publication No. H11-227433

BRIEF SUMMARY OF THE INVENTION

Problems to be Solved by the Invention

Since the dump truck has a possibility to run on rough roads while carrying crushed stones, an excessive load is repeatedly applied to the suspension. The dump truck is required to have durability which is capable of performing traveling continuously even in such a harsh driving environment.

The present invention has been provided in view of such problems, and the object thereof is to provide a dump truck capable of improving durability.

Means for Solving the Problem

A dump truck according to an aspect of the present invention includes: a vehicle-body frame; a wheel; and a suspension supporting the wheel in the vehicle-body frame. The suspension includes: a suspension cylinder swingably connected to an upper part of the vehicle-body frame; a king pin connected to a lower end of the suspension cylinder and extending further downward from the suspension cylinder; a suspension arm swingably connected to a lower part of the vehicle-body frame and having a through hole into which the king pin is vertically inserted; and a holding mechanism provided under the king pin and holding the suspension arm from below. The holding mechanism includes a locking member protruding from an outer peripheral surface of the king pin and arranged at a peripheral direction of the king pin, a fastening member mounted at a lower end of the king pin, and a holder fixed on the king pin by a fastening member and having a supported surface opposed to the locking member from above and along a peripheral direction of the locking member.

A dump truck according to another aspect of the present invention comprises: a vehicle-body frame, a wheel, and a suspension supporting the wheel in the vehicle-body frame. The suspension comprises a suspension cylinder swingably connected at an upper part of the vehicle-body frame, a king pin connected to a lower end of the suspension cylinder and extending further downward from the suspension cylinder, a spindle supporting the wheel and having a through hole into which the king pin is inserted in the vertical direction, and a holding mechanism provided at a lower part of the king pin and supporting the spindle from below. The holding mechanism includes a ring protruding from an outer peripheral surface of the king pin and extending annularly in a peripheral direction of the king pin, a fastening member attached to a lower end of the king pin, and a holder fixed on the king pin by the fastening member and having a supported surface opposed to the ring from above and along a peripheral direction of the ring.

Effects of the Invention

According to the dump truck of the above aspects, the durability can be improved.

DETAILED DESCRIPTION OF THE INVENTION

First Embodiment

Hereinafter, a first embodiment of a dump truck according to the present invention will be described in detail with reference to FIGS. 1 to 8.

Figure 1:
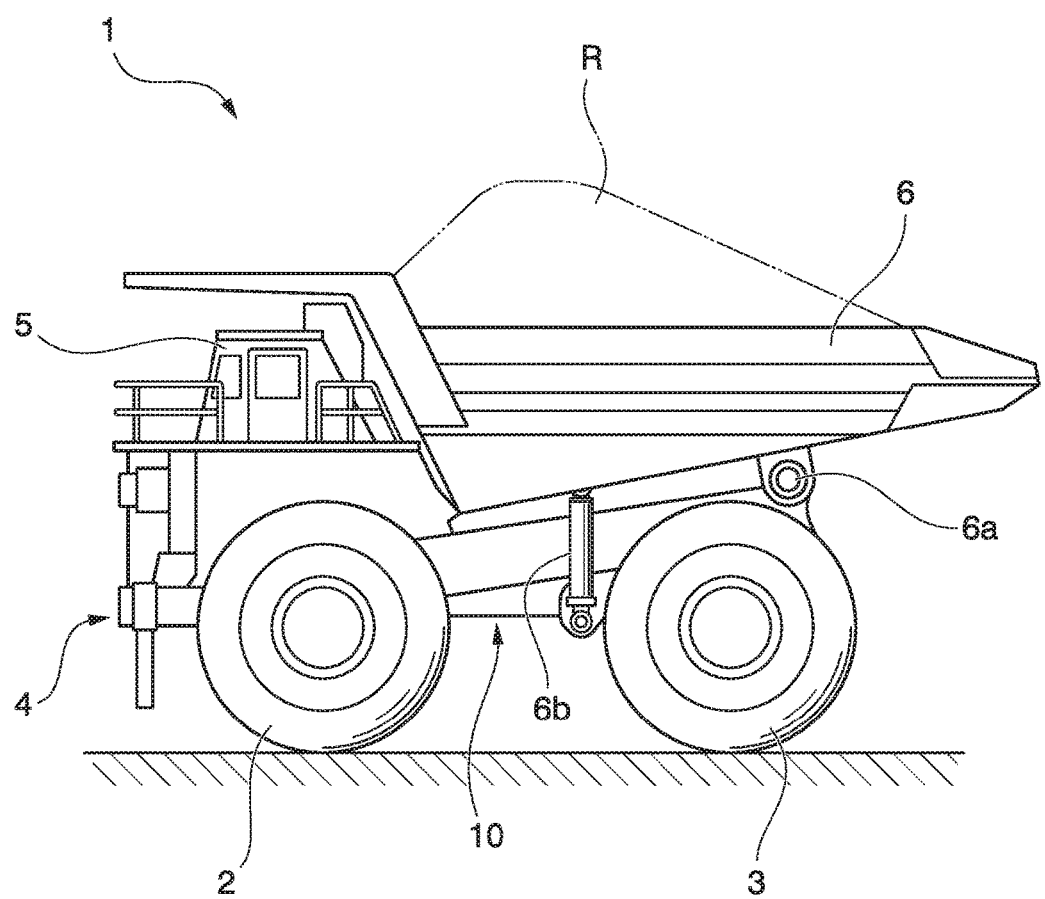
FIG. 1 is a side view of a dump truck according to a first embodiment of the present invention.

As shown in FIG. 1, a dump truck 1 includes a front wheel 2 (wheel), a rear wheel 3, and a vehicle body 4.

Hereinafter, front and rear directions of the vehicle body 4, a front direction of the vehicle body 4, a rear direction of the vehicle body 4, and a width direction of the vehicle body 4 may be simply referred to as "front-rear directions", "forward", "rearward", and "vehicle width direction", respectively. The direction toward a center of the vehicle width direction would be referred to as "a vehicle-width inward direction", and the direction from the center of the vehicle width direction toward the right or left side would be referred to as "a vehicle-width outward direction" in some cases. In addition, a vertical direction, an upward direction, and a downward direction of the dump truck 1 when the dump truck 1 is disposed on the horizontal plane may be simply referred to as "vertical direction", "upward", and "downward" in some cases.

<Vehicle Body>

The vehicle body 4 is supported so as to be capable of running by a pair of front wheels 2 and a pair of rear wheels 3, each of which is provided so as to be separated in the vehicle width direction. The vehicle body 4 has a cab 5, a vessel 6 and a vehicle-body frame 10. The cab 5 is provided in a front part of the vehicle body 4. The cab 5 is provided with a cockpit of a driver of the dump truck 1. The driver changes the traveling direction of the dump truck 1 by steering a steering wheel of the cockpit.

The vessel 6 is provided rearward the cab 5 in the vehicle body 4. The vessel 6 is a structure that is able to load a heavy transport object R such as crushed stones. Part of a forward side of the vessel 6 covers the cab 5 from above. A portion at a rearward side in a bottom of the vessel 6 is connected to the vehicle-body frame 10 by a connecting pin 6a. The vessel 6 is rotatable around an axis extending in the vehicle width direction with respect to the vehicle-body frame 10 by the connecting pin 6a. An upper end of a hoist cylinder 6b is connected to a portion at a forward side in the bottom of the vessel 6. A lower end of the hoist cylinder 6b is connected to the vehicle-body frame 10. With the connecting pin 6a as a fulcrum, the vessel 6 moves up and down with respect to the vehicle-body frame 10 by expansion and contraction of the hoist cylinder 6b.

<Vehicle-Body Frame>

Figure 2:
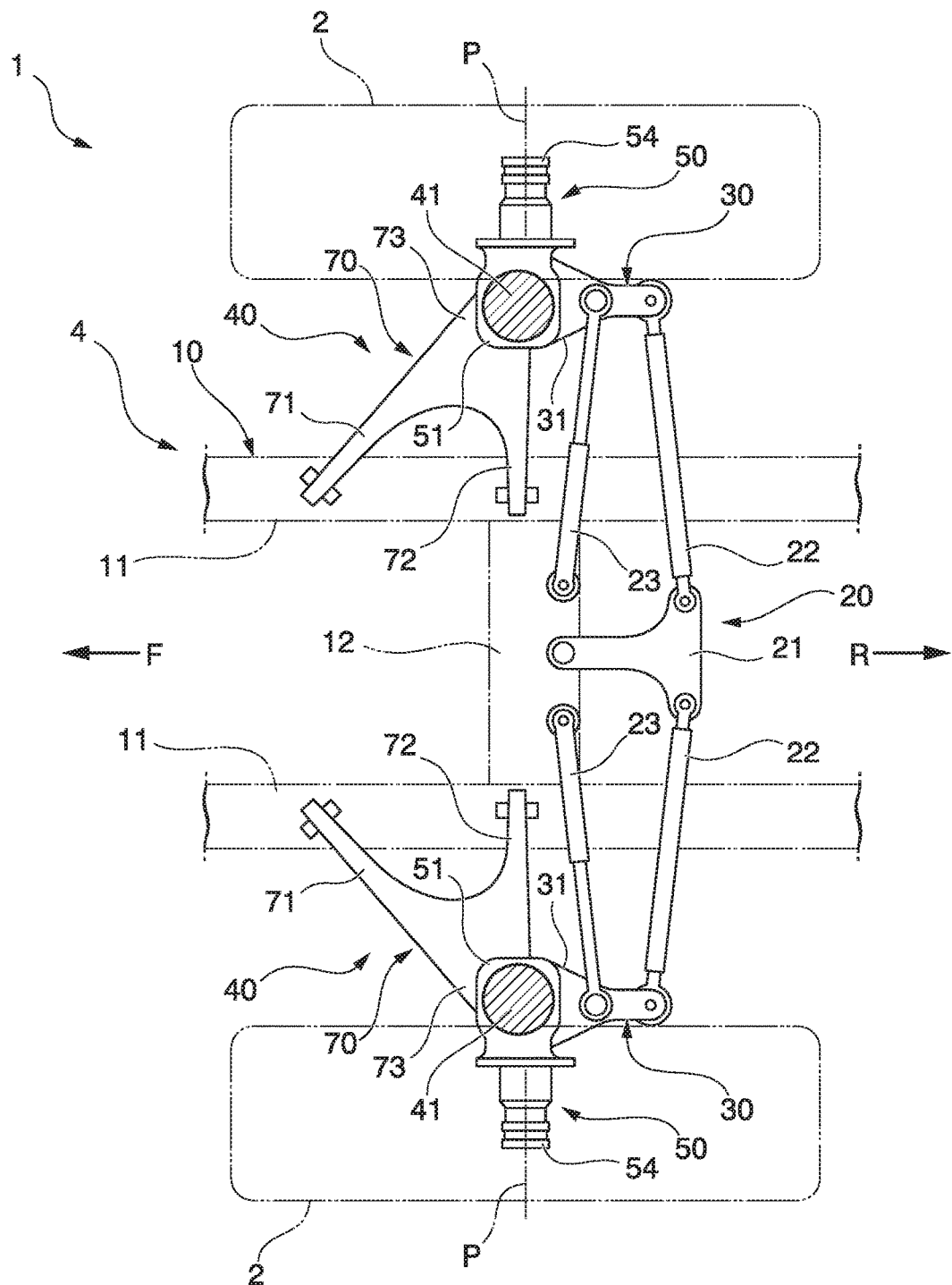
FIG. 2 is a plan view of a steering device and a suspension in the dump truck according to the first embodiment of the present invention.
Figure 3:
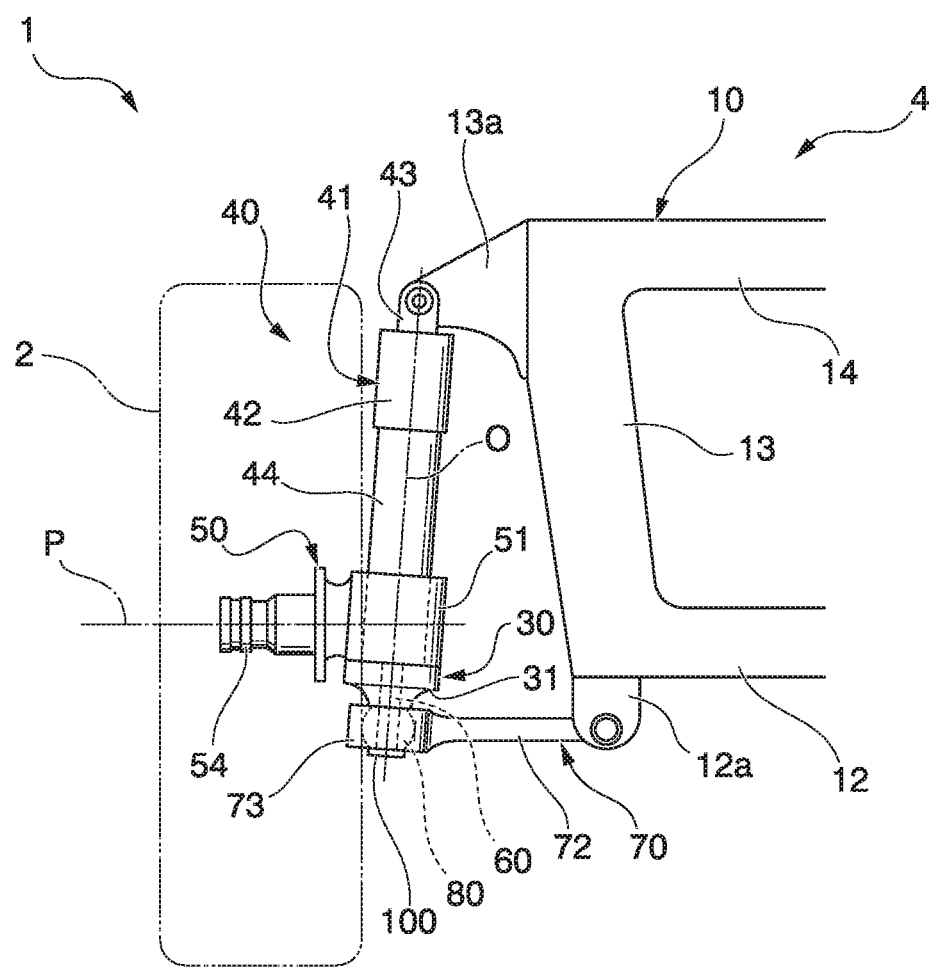
FIG. 3 is a front view of the suspension in the dump truck according to the first embodiment of the present invention.

The vehicle-body frame 10 supports the cab 5 and the vessel 6 from below. The vehicle-body frame 10 has a lower side member 11, a lower cross member 12, a vertical member 13 and an upper cross member 14 as shown in FIGS. 2 and 3. In FIG. 2, reference symbols F and R indicate the front-rear directions, F indicates forward, and R indicates rearward.

As shown in FIG. 2, the lower side member 11 extends in the front-rear directions, and a pair of the lower side members 11 is provided so as to be separated in the vehicle width direction. The pair of the lower side member 11 is provided in parallel with each other at the same height position.

As shown in FIG. 2 and FIG. 3, the lower cross member 12 extends in the vehicle width direction at a predetermined position in the front-rear directions in the vicinity of the front wheels 2 in the pair of the lower side members 11, and connects the pair of the lower side members 11 in the vehicle width direction.

As shown in FIG. 3, a pair of the vertical members 13 is provided so as to extend upward from a predetermined position in the front-rear directions in the vicinity of the front wheels 2 in the pair of the lower side member 11. The pair of the vertical members 13 is each provided symmetrically with respect to a center in the vehicle width direction. An upper cross member 14 extends in the vehicle width direction so as to connect the upper ends of the pair of the vertical members 13 to each other. The upper cross member 14 is provided above the lower cross member 12 and in parallel with the lower cross member 12.

The lower cross member 12, the pair of the vertical members 13, and the upper cross member 14 are provided in the same position in the front-rear direction.

As shown in FIG. 2, a forward of the pair of the lower side members 11 in the front-rear directions protrudes further forward than the arrangement position in the front-rear directions of the wheel (front wheel 2). That is, part forward in the front-rear directions of the pair of the lower side members 11 protrudes further forward than the lower cross member 12, the vertical members 13 and the upper cross member 14. A pair of upper side members (not shown) extending in the front-rear directions are provided above the pair of the lower side members 11 in correspondence with these lower side members 11.

As shown in FIGS. 2 and 3, the dump truck 1 includes a steering device 20 for steering the front wheel 2 and a pair of suspension devices 40 that supports the front wheel 2 with respect to the vehicle-body frame 10. Hereinafter, the steering device 20 and the suspension device 40 will be described in detail.

<Steering Device>

As shown in FIG. 2, the steering device 20 has a center lever 21, tie rods 22, steering cylinders 23 and knuckle arms 30.

The center lever 21 is connected at a center of the vehicle width direction of the lower cross member 12 in the vehicle-body frame 10 so as to be rotatable around an axis extending in the vertical direction. The center lever 21 extends rearward from such connection point.

A pair of the tie rods 22 is connected to the center lever 21 so as to be rotatable. Each of these tie rods 22 is provided on an edge on the rearward side of the center lever 21 so as to be rotatable around an axis extending in the vertical direction. Connection points of the pair of the tie rods 22 are separated from each other in the vehicle width direction. A pair of the tie rods 22 extends from each of the connection points with the center lever 21 toward the vehicle-width outward direction.

A pair of the knuckle arms 30 is provided so as to be separated in the vehicle width direction. A base end portion 31, which is portion at the forward side of each of the knuckle arms 30, is integrally connected to the suspension device 40 to be described later so as to be rotatable around a king pin 60 of said suspension device 40. Each knuckle arm 30 extends rearward from the connecting portion with the suspension device 40. A tip portion at the rearward of the knuckle arm 30 is connected at an edge of the vehicle-width outward direction of the tie rod 22 so as to be rotatable around an axis extending in the vertical direction.

A pair of the steering cylinders 23 is connected at a portion close to the center in the width direction of the lower cross member 12 of the vehicle-body frame 10 so as to be separated in the vehicle width direction. Connection points of the pair of the steering cylinder 23 with respect to the lower cross member 12 are arranged so as to sandwich the connection point of the center lever 21 from the vehicle width direction. Each steering cylinder 23 is connected to the lower cross member 12 so as to be rotatable around an axis extending in the vertical direction.

The pair of the steering cylinders 23 extends outward in the width direction from the connection point with the lower cross member 12. An edge of the vehicle-width outward direction of the steering cylinder 23 is connected to the knuckle arm 30 so as to be rotatable around an axis extending in the vertical direction. The connection point of the steering cylinder 23 with respect to the knuckle arm 30 is a portion forward of the connection point of the tie rod 22 with respect to the knuckle arm 30. The steering cylinder 23 is configured to expand and contract to an extension direction of the steering cylinder 23 according to the operation of the steering wheel by the driver in the cab 5.

<Suspension>

A pair of the suspension device 40 is provided so as to be separated in the vehicle width direction. As shown in FIG. 3, the suspension device 40 includes a suspension cylinder 41, a spindle 50, the king pin 60, a suspension arm 70, a spherical bearing 80, and a holding mechanism 100.

<Suspension Cylinder>

The suspension cylinder 41 is a shock absorber, and is provided so as to extend in the vertical direction. In the present embodiment, the suspension cylinder 41 is arranged along a reference axis O that extends toward the vehicle-width outward direction while directed downward. The suspension cylinder 41 has a cover 42 and a cylinder 44.

The cover 42 has a one-end closed cylindrical shape which extends along the reference axis O and whose upper end is closed. A lower end of the cover 42 is open. The upper end of the cover 42 is connected to an upper part of the vehicle-body frame 10 so as to be rotatable. In the present embodiment, a cylinder connecting portion 43 protruding further upward at the upper end of the cover 42 is provided. At the upper part of a surface facing the vehicle-width outward direction of the vertical member 13 in the vehicle-body frame 10, an upper bracket 13a protruding in the vehicle-width outward direction is provided. The cylinder connecting portion 43 is connected to so as to be rotatable around the axis that is oriented in the front-rear directions with respect to the upper bracket 13a.

Figure 4:
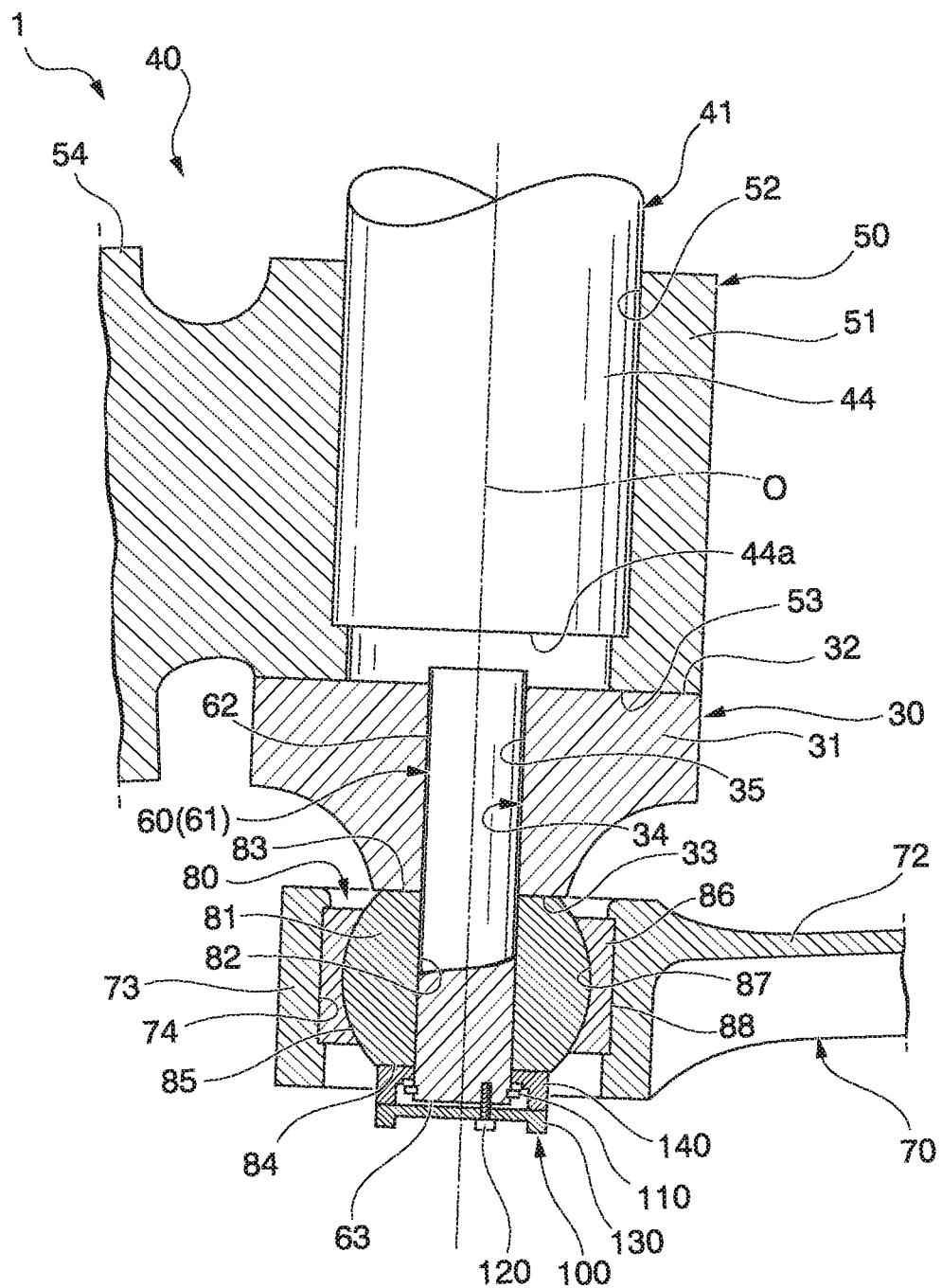
FIG. 4 is a vertical cross-sectional view of the suspension in the dump truck according to the first embodiment of the present invention as seen from a front side.

As shown in FIG. 4 in detail, the cylinder 44 has a one-end closed cylindrical shape which extends along the reference axis O and whose lower end is closed. An upper end of the cylinder 44 is open. An upper part of the cylinder 44 is fitted into an inside of the cover 42 from an opening at the lower end of the cover 42. The cylinder 44, in a state in which the lower part of the cylinder 44 protrudes from the cover 42, is provided so as to be relatively movable with respect to the suspension cylinder 41 in the direction along the reference axis O and so as to be relatively rotatable around the reference axis O with respect to the cover 42.

Inside a space between the cover 42 and the cylinder 44, a buffering mechanism having elasticity in a direction of the reference axis O which is the extension direction of the suspension cylinder 41 is configured. In the suspension cylinder 41, the cylinder 44 elastically protrudes and retracts with respect to the cover 42 according to the load received from the front wheel 2 and the vehicle body 4.

<Spindle>

The spindle 50 has a base portion 51 and a shaft portion 54 as shown in FIGS. 2 to 4. As shown in FIG. 4 in detail, the base portion 51 is provided so as to be rotatable around the reference axis O. In the present embodiment, the base portion 51 is provided in the suspension cylinder 41. The base portion 51 has a tubular shape with the reference axis O as the center. In an inner peripheral surface 52 of the base portion 51, a cross-sectional shape orthogonal to the reference axis O is a circle with the reference axis O as the center. In the base portion 51, the inner peripheral surface 52 of the base portion 51 is externally fitted to a portion at the lower end side of an outer peripheral surface of the cylinder 44. The base portion 51 is fixed to the cylinder 44 by the bolt which is not shown, and thus the base portion 51 is fixed integrally to the cylinder 44. In the state where the base portion 51 is fixed to the cylinder 44, a lower end surface 53 of the base portion 51 is positioned below, in the reference axis O, a lower end surface 44a of the cylinder 44 which is the lower end of the suspension cylinder 41. The lower end surface 53 of the base portion 51 has an annular shape surrounding the reference axis O and has a planar shape orthogonal to the reference axis O.

The shaft portion 54 is provided integrally with the base portion 51. The shaft portion 54 is protruded from the outer peripheral surface of the base portion 51 toward the vehicle-width outward direction. The shaft portion 54 has a columnar shape in which a center axis P is matched to a radial direction of a virtual circle centered in the reference axis O. As shown in FIG. 2 and FIG. 3, the front wheel 2 is supported by the shaft portion 54 in such a way that the center axis P of the front wheel 2 is coincided with a central axis of the shaft portion 54.

<King Pin>

As shown in FIG. 4, the king pin 60 has a king pin body 61 having a columnar shape that is centered in the reference axis O and extends in the reference axis O. In the present embodiment, since the king pin 60 and the king pin body 61 have the same configuration, in the following description, the king pin body 61 will be simply referred to as "the king pin 60". The king pin 60 is connected to a lower end of the suspension cylinder 41. The king pin 60 extends from the lower end of the suspension cylinder 41 so as to further protrude downward along the reference axis O. In the present embodiment, the king pin 60 is not directly connected to the suspension cylinder 41, but is indirectly connected to the suspension cylinder 41 via the spindle 50 and the knuckle arm 30. The relative position of the king pin 60 with respect to the suspension cylinder 41 is defined by the spindle 50 and the knuckle arm 30.

That is, the base end portion 31 of the knuckle arm 30 has an upper end surface 32 facing upward along the reference axis O and having a planar shape orthogonal to the reference axis O. The knuckle arm 30 is integrally fixed to the spindle 50 by the bolt (not shown) in a state where the upper end surface 32 of the knuckle arm 30 abuts on the lower end surface 53 of the base portion 51 of the spindle 50 along a peripheral direction of the knuckle arm 30. The upper end surface 32 of the knuckle arm 30 and a lower end surface 44a of the cylinder 44 of the suspension cylinder 41 are separated from each other in the direction of the reference axis O. As a result, the space surrounded by an inner peripheral surface 52 of the spindle 50 is formed between the upper end surface 32 of the knuckle arm 30 and the lower end surface 44a of the cylinder 44.

The base end portion 31 of the knuckle arm 30 has a connecting hole 34 centered in the reference axis O and penetrating in the vertical direction along the reference axis O. An inner peripheral surface 35 of the connecting hole 34 is fitted with an upper part of an outer peripheral surface 62 of the king pin 60. That is, the upper part of the king pin 60 is fitted in the connecting hole 34 of the knuckle arm 30. As a result, a lower part of the king pin 60 protrudes further downward along the reference axis O than a lower end surface 33 of the base end portion 31 of the knuckle arm 30. The lower end surface 33 of the knuckle arm 30 has an annular shape orthogonal to the reference axis O and surrounding the reference axis O. An outer diameter at the lower end surface 33 of the knuckle arm 30 is smaller than an outer diameter at the upper end surface 32 of the knuckle arm 30.

The inner peripheral surface 35 of the connecting hole 34 and the outer peripheral surface 62 of the king pin 60 are preferably to be interference fit. As a result, the king pin 60 and the knuckle arm 30 are fixedly integrated. The central axis of the king pin 60 connected to the suspension cylinder 41 via the spindle 50 and the knuckle arm 30 is identical with the central axis of the suspension cylinder 41. That is, the king pin 60 and the suspension cylinder 41 each extend in the reference axis O as the center. Hereinafter, the radial direction of the king pin 60 which is a radial direction of a virtual circle where the reference axis O is the center is simply referred to as "the radial direction".

<Suspension Arm>

The suspension arm 70 is a so-called A-frame. As shown in FIGS. 2 and 3, the suspension arm 70 is swingably connected to a lower part of the vehicle-body frame 10, and is connected to the king pin 60 from the lower part of the vehicle-body frame 10 to the vehicle-width outward direction. The suspension arm 70 has a front-side arm part 71, a rear-side arm part 72 and an arm connecting portion 73, as shown in FIG. 2.

On the front-side arm part 71, the edge of the vehicle-width inward direction is connected to the lower part of the lower side member 11 in the vehicle-body frame 10 so as to be the rocking-capable via a bracket not shown. The front-side arm part 71 is connected to a portion further forward than the position of the lower cross member 12 in the lower side member 11. At the connection point on the front-side arm part 71 with the lower side member 11, the front-side arm part 71 of the suspension arm 70 is swingable around the axis extending toward the vehicle-width inward direction while directed in rearward. The shape of the front-side arm part 71 extends rearward from the connection point with the vehicle-body frame 10 while directed to the vehicle-width outward direction.

On the rear-side arm part 72, the edge in the vehicle-width inward direction is connected to the lower part of the lower side member 11 in the vehicle-body frame 10 so as to be swingable via the lower bracket 12a shown in FIG. 3. The rear-side arm part 72 is connected to the part corresponding to the lower cross member 12 in the lower side member 11. On the connection point on the back side the arm part 72, the rear-side arm part 72 of the suspension arm 70 can be the rocking in around the axis extending in the front-rear directions. The shape of the rear-side arm part 72 is formed so as to extend from the connection point with the vehicle-body frame 10 to the vehicle-width outward direction.

The arm connecting portion 73 is integrally provided at the tip of the front-side arm part 71 and the rear-side arm part 72 in the vehicle-width outward direction. The arm connecting portion 73 is supported by the front-side arm part 71 and the rear-side arm part 72. As shown in FIG. 4, the arm connecting portion 73 has a through hole 74 penetrating the arm connecting portion 73 in the vertical direction. In the through hole 74, a portion on the lower end 63 side of the king pin 60 is inserted in the vertical direction. An inner diameter of an inner peripheral surface of the through hole 74 is set larger than an outer diameter of the outer peripheral surface 62 of the king pin 60. The arm connecting portion 73 is swingable in the vertical direction at the connection point, as the fulcrum, of the front-side arm part 71 and the rear-side arm part 72 with the vehicle-body frame 10.

<Spherical Bearing>

As shown in FIG. 4, the spherical bearing 80 is provided between the outer peripheral surface 62 of the king pin 60 and the inner peripheral surface of the through hole 74 of the suspension arm 70 through which the king pin 60 passes. The spherical bearing 80 allows a relative rotation between the king pin 60 and the suspension arm 70. The spherical bearing 80 has an inner ring 81 and an outer ring 86.

The inner ring 81 has a tubular shape with the reference axis O as the center. The inner ring 81 is externally fitted to a portion below the knuckle arm 30 at the outer peripheral surface 62 of the king pin 60. An inner diameter of an inner peripheral surface 82 of the inner ring 81 is set larger than the outer diameter of the outer peripheral surface 62 of the king pin 60. Therefore, the inner peripheral surface 82 of the inner ring 81 is clearance fitted to the king pin 60. As a result, the inner ring 81 is detachable with respect to the king pin 60.

An upper end face 83 of the inner ring 81 facing upward along the reference axis O has a planar shape orthogonal to the reference axis O. The upper end face 83 of the inner ring 81 abuts on the lower end surface 33 of the knuckle arm 30 along the entire peripheral direction.

The lower end surface 84 of the inner ring 81 facing downward along the reference axis O has a planar shape orthogonal to the reference axis O. An outer peripheral surface of the inner ring 81 is a sliding-contact outer peripheral surface 85 having a spherical shape.

The outer ring 86 has a tubular shape enclosing the inner ring 81 from an outer peripheral side of the inner ring 81. The inner peripheral surface of the outer ring 86 is a sliding-contact inner peripheral surface 87 recessed in a spherical shape corresponding to the sliding-contact outer peripheral surface 85 of the inner ring 81. The sliding-contact inner peripheral surface 87 of the outer ring 86 slidably contacts with the sliding-contact outer peripheral surface 85 of the inner ring 81 in an arbitrary direction according to the shape of these spherical surfaces.

An outer peripheral surface 88 of the outer ring 86 has a cylindrical surface shape. The outer peripheral surface 88 of the outer ring 86 is fitted into the inner peripheral surface of the through hole 74 of the suspension arm 70. A snap ring which is not shown is incorporated in the inner peripheral surface of the through hole 74. On the lower end surface of the outer ring 86, the snap ring abuts from below so as to prevent the outer ring 86 from falling down. As a result, the outer ring 86 is fixed to the suspension arm 70 together.

The inner ring 81 and the outer ring 86 are integrated with each other. For the outer ring 86, an axial load from the inner ring 81 in the direction of the reference axis O and a radial load in the radial direction of the king pin 60 are applied.

<Holding Mechanism>

Next, the holding mechanism 100 will be explained. The holding mechanism 100 is provided at a bottom of the king pin 60 and holds the suspension arm 70 from below. The holding mechanism 100 maintains the state that the king pin 60 is passing through the through hole 74 of the suspension arm 70. That is, the holding mechanism 100 prevents the suspension arm 70 from dropping out with respect to the king pin 60.

In the present embodiment, the holding mechanism 100 supports the spherical bearing 80 from below. As a result, the holding mechanism 100 indirectly supports the suspension arm 70 with which the spherical bearing 80 is fixed integrally. That is, the holding mechanism 100 supports the suspension arm 70 via the spherical bearing 80.

Figure 5:
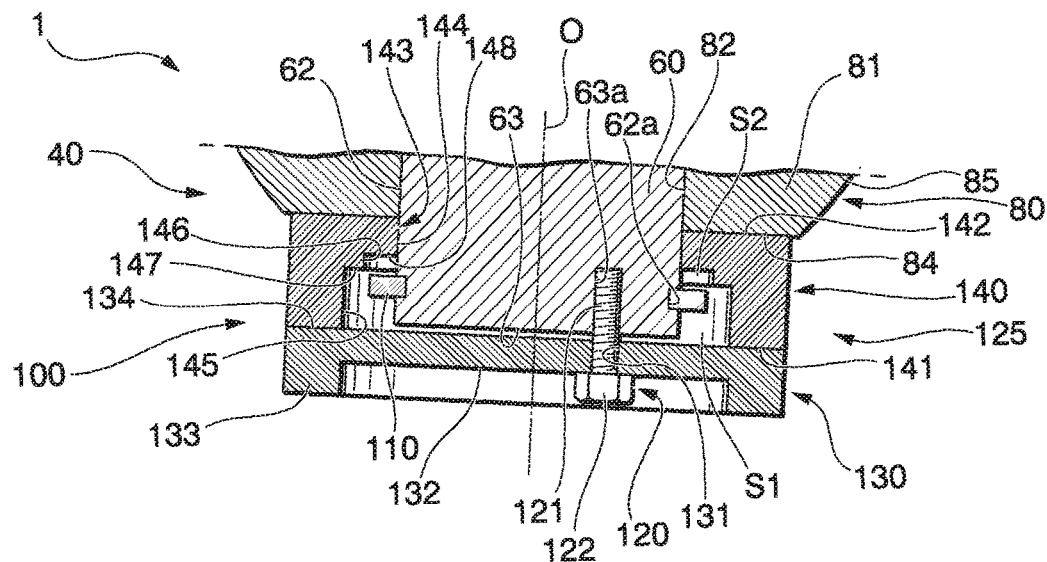
FIG. 5 is an enlarged view of a main part of FIG. 4.

The holding mechanism 100 has a snap ring 110 (ring, locking member), a bolt 120 (fastening member), a holder body 130, and an annular stopper 140, as shown in FIG. 5 in detail. A holder 125 is configured with the holder body 130 and the annular stopper 140 constitute.

<Snap Ring>

The snap ring 110 is a portion below the spherical bearing 80 in the outer peripheral surface 62 of the king pin 60 and is provided in a portion above the lower end 63 of the king pin 60. The snap ring 110 protrudes radially outward from the outer peripheral surface 62 of the king pin 60 to and has a ring shape extending annularly in the peripheral direction of the king pin 60. The snap ring 110 has a C-letter shape whose part in the peripheral direction is divided and thus edges in the peripheral direction face each other. The snap ring 110 is made of a material such as a metal having elasticity or flexibility.

Figure 6:
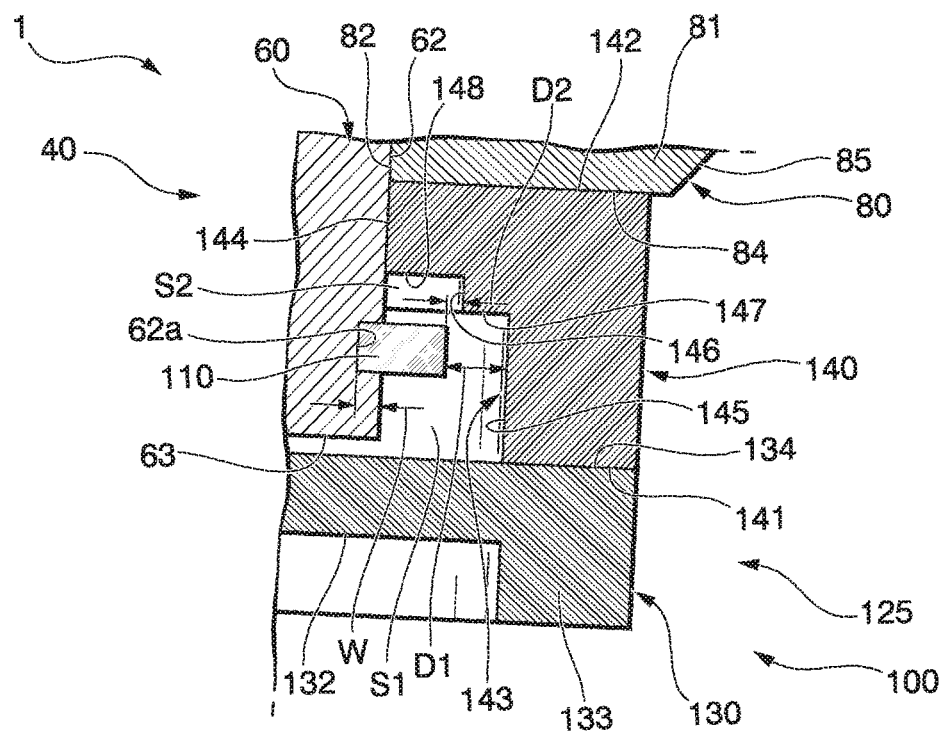
FIG. 6 is an enlarged view of the vicinity of a ring (locking member) in FIG. 5.

In this embodiment, as shown in FIG. 6 in detail, a groove 62a that is recessed radially inward from the outer peripheral surface 62 of the king pin 60 and extends annularly in the peripheral direction is formed at a position where the snap ring 110 is arranged in the outer peripheral surface 62 of the king pin 60. The groove 62a has a round shape with the reference axis O as the center. In the snap ring 110, only a radially inward part is fixed integrally to the king pin 60 by fitting into the groove 62a from radially outward of the groove 62a. Only a radially outward part of the snap ring 110 protrudes radially outward from the outer peripheral surface 62 of the king pin 60. The snap ring 110 is detachable with respect to the king pin 60 from radially outward of the king pin 60 by bending and expanding a diameter of the C-letter shape in such a way that a pair of the edges of the C-letter shape is spaced apart.

<Bolt (Fastening Member)>

As shown in FIG. 5, the bolt 120 is attached to the lower end 63 of the king pin 60. The bolt 120 has a shaft portion 121 and a head portion 122. The shaft portion 121 has a columnar shape, and an outer peripheral surface of the shaft portion 121 is formed with a male screw. The head portion 122 is integrally provided at one end of the shaft portion 121, and an outer diameter of the head portion 122 is larger than the shaft portion 121.

A bolt mounting hole 63a that is recessed from the lower end of the king pin 60 toward the upward side along the reference axis O is formed at the lower end 63 of the king pin 60. A female screw is formed in an inner peripheral surface of a bolt mounting hole 63a. The bolt 120 is integrally provided at the lower end 63 of the king pin 60 by fastening the shaft portion 121 to the bolt mounting hole 63a of the king pin 60. Although only one the bolt 120 and the bolt mounting hole 63a are shown in FIG. 5, it is also possible that a plurality of bolt mounting holes 63a are provided around the reference axis O and a plurality of the bolt 120 are provided corresponding to these bolt mounting hole 63a.

<Holder Body>

As shown in FIG. 5, the holder body 130 is attached to the lower end 63 of the king pin 60 by the bolt 120. The holder body 130 has a plate shape extending in a direction orthogonal to the reference axis O, and in the present embodiment, the holder body 130 has a disk shape with the reference axis O as the center.

In the holder body 130, a bolt insertion hole 131 penetrating in the direction along the reference axis O is formed. The shaft portion 121 of the bolt 120 passes through the bolt insertion hole 131. The lower surface 132 which is the surface facing downward the holder body 130 in the reference axis O has a planar shape orthogonal to the reference axis O. The head portion 122 of the bolt 120 abuts on the lower surface 132 of the holder body 130 from below along the reference axis O. Thereby, the holder body 130 is fixed to the lower end 63 of the king pin 60 via the bolt 120. At a portion at outer peripheral side of the lower surface 132 of the holder body 130, an edge portion 133 further protrudes downward along the reference axis O from the holder body 130 and extends annularly with the reference axis O as the center is formed.

The upper surface 134 which is the surface facing upward along the reference axis O in the holder body 130 has a planar shape orthogonal to the reference axis O. That is, the upper surface 134 of the holder body 130 is arranged parallel to the lower surface 132 of the holder body 130. The upper surface 134 of the holder body 130 faces the lower end 63 of the king pin 60. In the present embodiment, the upper surface 134 of the holder body 130 is arranged on the lower side the lower end 63 of the king pin 60 in the reference axis O via a clearance.

The outer diameter of the holder body 130 is set larger than the outer diameter of the king pin 60. As a result, in the state where the holder body 130 is fixed to the lower end 63 of the king pin 60, a radially outward portion of the holder body 130 projects further radially outward of the king pin 60 than the outer peripheral surface 62 of the king pin 60. Therefore, the upper surface 134 of the holder body 130 also extends from the outer peripheral surface 62 of the king pin 60 in the radially outward direction of the king pin 60. The outer diameter on the upper surface 134 of the holder body 130 is set larger than the outer diameter of the snap ring 110.

<Annular Stopper>

As shown in FIG. 5, the annular stopper 140 forms the tubular enclosing the king pin 60 from an outer peripheral side thereof. The annular stopper 140 has a cylindrical shape with the reference axis O as the center. The annular stopper 140 is provided at a portion below the spherical bearing 80 at the outer peripheral surface 62 of the king pin 60 and at the portion above the lower end 63 of the king pin 60. The annular stopper 140 is provided between the inner ring 81 and the holder body 130 of the spherical bearing 80.

The surface facing the lower side of the reference axis O in the annular stopper 140 is a lower end surface 141 having a planar shape orthogonal to the reference axis O. The lower end surface 141 of the annular stopper 140 has an annular shape with the reference axis O as the center. The lower end surface 141 of the annular stopper 140, along the peripheral direction thereof, abuts on a portion, which projects further radially outward than the king pin 60, of the upper surface 134 of the holder main body 130, from above.

The surface facing upward along the reference axis O in the annular stopper 140 is an upper end surface 142 having a planar shape orthogonal to the reference axis O. The upper end surface 142 and the lower end surface 141 of the annular stopper 140 are arranged in parallel to each other. The upper end surface 142 of the annular stopper 140 has an annular shape with the reference axis O as the center. The upper end surface 142 of the annular stopper 140 abuts on the lower end surface 84 of the inner ring 81 of the spherical bearing 80 from below along the peripheral direction. The outer diameter at the upper end surface 142 of the annular stopper 140 is set larger than the inner diameter of the inner ring 81 of the spherical bearing 80 (the inner diameter of the inner peripheral surface 82).

In the annular stopper 140, the lower end surface 141 abuts on the holder body 130 and the upper end surface 142 abuts on the inner ring 81, and thus the annular stopper 140 is held so as to be sandwiched between these holder body 130 and inner ring 81 from the direction along the reference axis O. That is, the annular stopper 140 is fixed by a fastening force of the bolt 120. The size of the clearance between the lower end 63 of the king pin 60 and the upper surface 134 of the holder body 130 is defined by the size of the annular stopper 140 in the direction along the reference axis O.

An inner peripheral surface 143 of the annular stopper 140 has a round shape with the reference axis O as the center. The inner peripheral surface 143 of the annular stopper 140 has a fitting inner peripheral surface 144, a first inner peripheral surface 145 and a second inner peripheral surface 146 as shown in FIG. 6 in detail.

The fitting inner peripheral surface 144 is an upper part in the inner peripheral surface 143 of the annular stopper 140 and is connected to the upper end surface 142 of the annular stopper 140. The fitting inner peripheral surface 144 is externally fitted to the outer peripheral surface 62 of the king pin 60. It is preferable that the fitting inner peripheral surface 144 is clearance fitted to the outer peripheral surface 62 of the king pin 60.

The first inner peripheral surface 145 is a lower portion in the inner peripheral surface 143 of the annular stopper 140 and is connected to a lower end surface 141 of the annular stopper 140. The inner diameter of the first inner peripheral surface 145 is set to be larger than the outer diameter of the king pin 60, as shown in FIG. 6 in detail. As a result, the first inner peripheral surface 145 defines a first space S1 in an annular shape with the reference axis O as the center so as to interpose the first space S1 between the outer peripheral surface 62 of the king pin 60 and the first inner peripheral surface 145.

The inner diameter of the first inner peripheral surface 145 is set larger than the outer diameter of the snap ring 110. The first inner peripheral surface 145 extends from the lower end surface 141 of the annular stopper 140 to a portion above the snap ring 110 along the reference axis O. As a result, the first space S1 defined by the first inner peripheral surface 145 opens downward in the annular stopper 140 and accommodates the snap ring 110.

The second inner peripheral surface 146 is located below the fitting inner peripheral surface 144 and above the first inner peripheral surface 145. That is, the second inner peripheral surface 146 is arranged so as to be sandwiched between the fitting inner peripheral surface 144 and the first inner peripheral surface 145 in the direction along the reference axis O. The inner diameter of the second inner peripheral surface 146 is set larger than the outer diameter of the king pin 60. As a result, the second inner peripheral surface 146 defines a second space S2 in an annular shape with the reference axis O as the center so as to interpose the second space S2 between the outer peripheral surface 62 of the king pin 60 and the second inner peripheral surface 146. The second space S2 is arranged to be continuous to an upper side of the first space S1.

The inner diameter of the second inner peripheral surface 146 is set larger than the outer diameter of the snap ring 110 and smaller than the outer diameter of the first inner peripheral surface 145. As a result, a step surface 147 intersecting these first inner peripheral surface 145 and second inner peripheral surface 146 is formed between the first inner peripheral surface 145 and the second inner peripheral surface 146. The step surface 147 has an annular shape with the reference axis O as the center. The step surface 147 has a planar shape orthogonal to the reference axis O and faces downward. A position of the step surface 147 in the direction along the reference axis O is the same position as or more upward position than the upper end of the snap ring 110. Therefore, at the normal case, the snap ring 110 is not positioned in the second space S2, but is accommodated only in the first space S1 from either of the first space S1 or the second space S2.

The inner diameter of the second inner peripheral surface 146 is larger than the inner diameter of the fitting inner peripheral surface 144. Thereby, between the fitting inner peripheral surface 144 and the second inner peripheral surface 146, a supported surface 148 as a step is formed between the fitting inner peripheral surface 144 and the second inner peripheral surface 146. The supported surface 148 has an annular shape with the reference axis O as the center. The supported surface 148 has a planar shape orthogonal to the reference axis O and faces downward. An upper end of the second space S2 is closed by the supported surface 148. The supported surface 148 is opposed to a part of the upper end of the snap ring 110 from above in the reference axis O and along the peripheral direction of the snap ring 110.

Here, as shown in FIG. 6, a difference D1 between the outer diameter of the snap ring 110 and the inner diameter of the first inner peripheral surface 145 is set to a value equal to or greater than a depth W of the groove 62a of the king pin 60. A difference D2 between the outer diameter of the snap ring 110 and the inner diameter of the second inner peripheral surface 146 is set smaller than the depth W of the groove 62a of the king pin 60. The depth W of the groove 62a represents a distance from the outer peripheral surface 62 of the king pin 60 to a bottom of the groove 62a (an edge at the radially inward side).

<Effects of the Suspension of the Dump Truck>

In the dump truck 1, a weight of the vehicle body 4 is supported via the suspension device 40 provided between the vehicle body 4 and the front wheels 2. At the time of traveling the dump truck 1, an impact transmitted to the vehicle body 4 from a road surface on which the front wheels 2 contact is reduced by the suspension cylinder 41.

Since the dump truck 1 has a possibility to carry heavy objects such as crushed stones as the transport object R and travel bad road, the suspension device 40 is repeatedly imparted to the load. Most of the load will be received by the front wheels 2 and the rear wheels 3. In the suspension device 40 of the front wheels 2, the holding mechanism 100 that receives a load of the suspension arm 70 via the spherical bearing 80 at the lower end 63 of the king pin 60 will be subjected to the load including at least the weight of the suspension arm 70. Such load, as shown in FIG. 5, is transmitted from the inner ring 81 of the spherical bearing 80 to the annular stopper 140 of the holding mechanism 100 that abuts on the downward part of the inner ring 81. The load transmitted to the annular stopper 140 is transmitted to the holder body 130 abutting on the downward part of the annular stopper 140. In the present embodiment, the holder body 130 is fixed to the king pin 60 by the bolt 120. Therefore, the above load applied to the holder body 130 is received by the fastening force of the bolt 120 for the king pin 60.

Here, for example, if a load over the assumed value is repetitively applied to the bolt 120, it is assumed that the bolt 120 loosens. As a result, if the bolt 120 falls out from the bolt mounting hole 63a of the king pin 60, the holder body 130 supported by the bolt 120 also falls down, and there is no structure supporting the annular stopper 140 from below. Therefore, unless any countermeasures are taken, the suspension arm 70 and the spherical bearing 80 supported by the annular stopper 140 will fall out from the king pin 60, and it becomes difficult for the dump truck 1 to continue traveling.

While on the other hand, according to the dump truck 1 of the present embodiment, even if the bolt 120 of the holding mechanism 100 is disconnected by the above load, the travel of the dump truck 1 can be continued.

Figure 7:
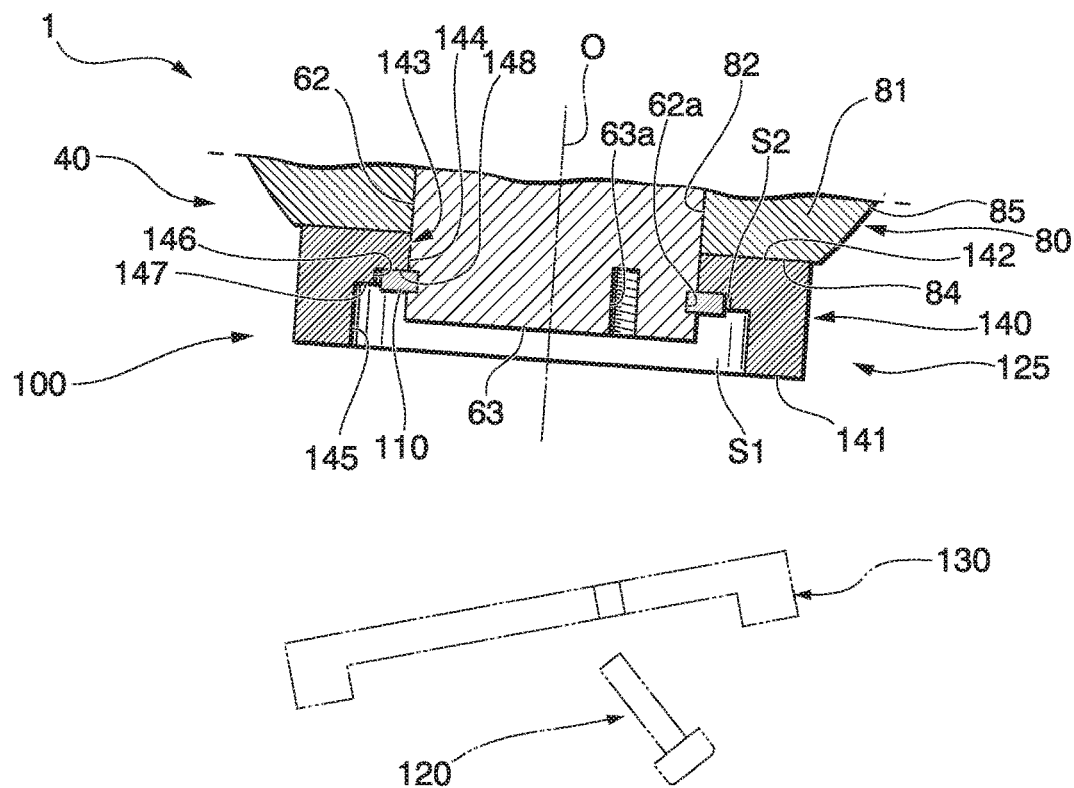
FIG. 7 is a diagram showing a state in which a holder body has fallen down.
Figure 8:
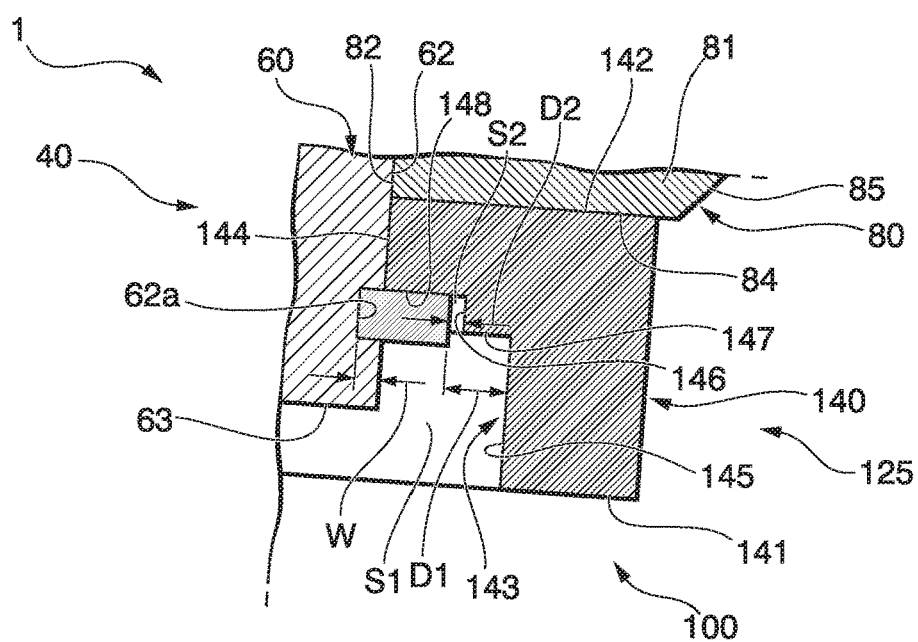
FIG. 8 is an enlarged view of the vicinity of the ring (locking member) in FIG. 7.

That is, when the bolt 120 and the holder body 130 are fallen out, the annular stopper 140 also falls down from the initial position thereof at the same time. As a result, as shown in FIGS. 7 and 8, the snap ring 110 is accommodated in the second space S2 inside the annular stopper 140. At the normal case, the supported surface 148 of the annular stopper 140 oppositely disposed above the snap ring 110 abuts on the snap ring 110 from above. That is, the annular stopper 140 is prevented from falling out by the annular stopper 140 being supported from below by the snap ring 110.

At this time, the load of the suspension arm 70 applied to the annular stopper 140 via the spherical bearing 80 is also supported by the snap ring 110. Therefore, it is possible to prevent the annular stopper 140, the spherical bearing 80, and the suspension arm 70 from falling out from the king pin 60 and falling down in the downward direction. As a result, even when the bolt 120 and the holder body 130 are fallen down, the running of the dump truck 1 can be continued. Therefore, according to the dump truck 1 of the present embodiment, it is possible to improve the durability with respect to severe the driving environment.

Since both the snap ring 110 and the supported surface 148 has an annular shape along the peripheral direction, the snap ring 110 can receive the load from the supported surface 148 dispersedly in the peripheral direction. As a result, the load of the suspension arm 70 via the supported surface 148 is possible to receive reliably by the snap ring 110.

In the present embodiment, in the normal case in which the holder body 130 is supported by the bolt 120, the supported surface 148 of the annular stopper 140 are separated in the upward direction from the snap ring 110 via the first space S1. Therefore, since a load from above is never applied to the snap ring 110 at the normal case, no damage such as scar and wear occurs on the snap ring 110. Therefore, when the bolt 120 and the holder body 130 are fallen down, it is possible to properly support the load from the supported surface 148 of the annular stopper 140. Thus, more continuous traveling of the dump truck 1 is possible.

In the present embodiment, since the inner diameter of the second inner peripheral surface 146 is formed larger than the outer diameter of the snap ring 110, the snap ring 110 can be easily attached when assembling the holding mechanism 100. That is, when mounting the holding mechanism 100, the annular stopper 140 is fitted to the lower part of the king pin 60 from below in a state where the king pin 60 penetrates the spherical bearing 80 and the suspension arm 70 vertically. Then, the snap ring 110 is fitted to the outer peripheral surface 62 of the king pin 60 within the first space S1 between the king pin 60 and the annular stopper 140. At this time, since the inner diameter the first inner peripheral surface 145 are larger than the outer diameter of the snap ring 110, a space enough to increase the diameter of the snap ring 110 is ensured within the first space S1. That is, since a volume of the first space S1 is secured large, the snap ring 110 can be easily attached to the king pin 60.

In the present embodiment, since the difference D1 between the outer diameter of the snap ring 110 and the inner diameter of the first inner peripheral surface 145 is set equal to or larger than the depth W of the groove 62*a*, the snap ring 110 can be easily attached to the groove 62*a*. Further, even when removing the snap ring 110 from the king pin 60 for maintenance, the snap ring 110 can be easily removed without imposing an excessive load on the snap ring 110.

Furthermore, in this embodiment, the difference D2 the outer diameter of the snap ring 110 and the inner diameter of the second inner peripheral surface 146 is set smaller than the dimension of the depth W of the groove 62*a*. Therefore, even if the annular stopper 140 falls down as described above and becomes in a state where the snap ring 110 abuts on the supported surface 148 within the second space S2, the snap ring 110 will not be able to expand to such an extent that deviates from the groove 62*a*. That is, in the second space S2, there is no space enough to increase the diameter of the snap ring 110. Accordingly, even when an excessive load from above applied on the snap ring 110, the snap ring 110 can be prevented from deviates from the groove 62*a*. Therefore, it is possible to receive more reliably the spherical bearing 80 and the load of the suspension arm 70 by the snap ring 110.

Second Embodiment

Figure 9:
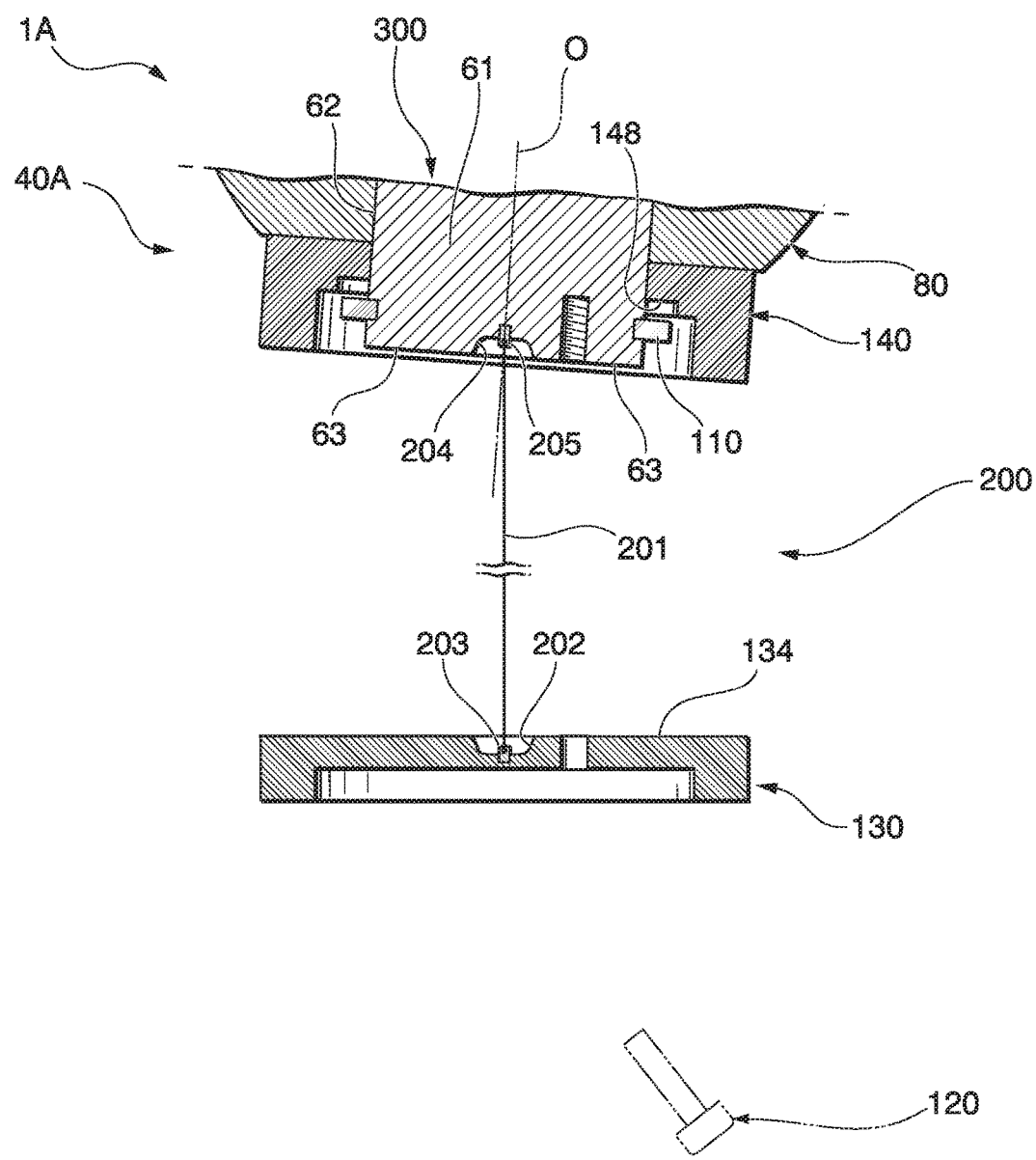
FIG. 9 is a diagram showing a state in which a holder body in a suspension of a dump truck according to the second embodiment of the present invention has fallen down.

Next, a second embodiment of the present invention will be described with reference to FIG. 9. In the second embodiment, the same reference numerals are given to the same structural elements with the first embodiment and will not be described in detail. A holding mechanism 200 of a suspension system 40A in a dump truck 1A of the second embodiment is different from the first embodiment in that a linear member 201 is further included in addition to the holding mechanism 100 of the first embodiment.

In the second embodiment, in a center of the upper surface 134 of the holder body 130, a holder-side concave portion 202 recessed downward along the reference axis O is formed. At a bottom of the holder-side concave portion 202, a holder-side convex portion 203 protruding upward along the reference axis O is formed. In a center of the lower end 63 of the king pin 60, a pin-side concave portion 204 recessed upward along the reference axis O is formed. In the bottom of the pin-side concave portion 204, the pin-side convex portion 205 protruding downward along the reference axis O is formed. In a state where the holder body 130 is attached to the king pin 60, an accommodating space is formed by the holder-side concave portion 202 and the pin-side concave portion 204.

The linear member 201 is, for example, a member formed of a cord, chain, wire or the like and having a linear shape. One end of the linear member 201 is fixed to the pin-side convex portion 205, the other end is fixed to the holder-side convex portion 203. The linear member 201 is accommodated in a relaxed state within the accommodating space in the normal case. Here, the relaxed state represents a state in which the linear member 201 is loosened without being subjected to tension in its extension direction. In addition, the one end of the linear member 201 may be fixed to any position of the kingpin 60 side and the side from which the holder body 130 is detached. The other end of the linear member 201 may be fixed to any position of the holder body 130 side.

According to the dump truck 1 of the present embodiment, as the same with the above, when the bolt 120 and the holder body 130 are fallen down, the holder body 130 becomes in a state of being suspended in the king pin 60 via the linear member 201. That is, the linear member 201 which has been in the relaxed state at the normal case is fallen down with the holder body 130, and eventually becomes in a suspended state in which tension is applied in accordance with the weight of the holder body 130. Thus, the operator can be recognized the fallen state of the holder body 130 from around, without looking into the king pin 60 from below. That is, since it is possible to easily recognize a falling down of the bolt 120 and the holder body 130 by visual inspection, maintainability is possible to improve.

Third Embodiment

Figure 10:
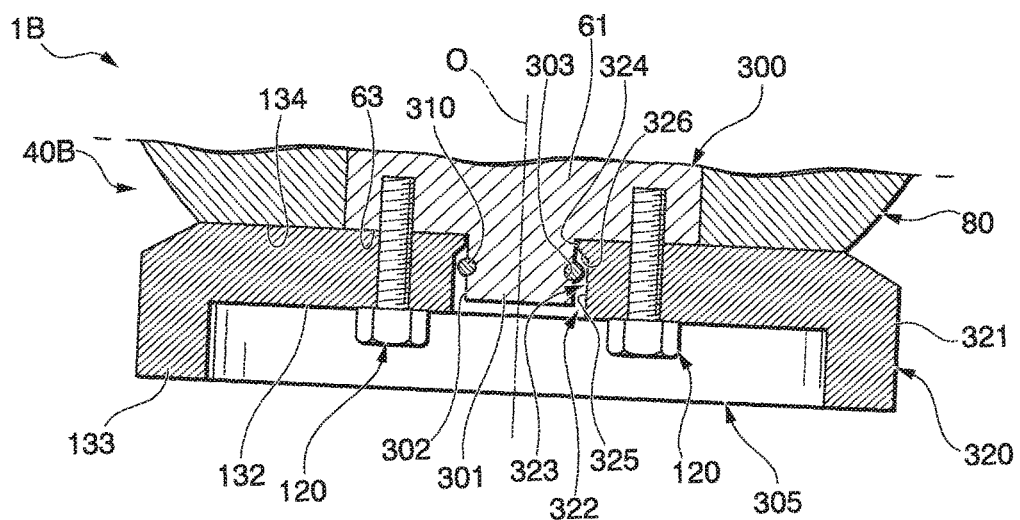
FIG. 10 is a vertical cross-sectional view of a suspension of a dump truck according to the third embodiment of the present invention as seen from a front side.
Figure 11:
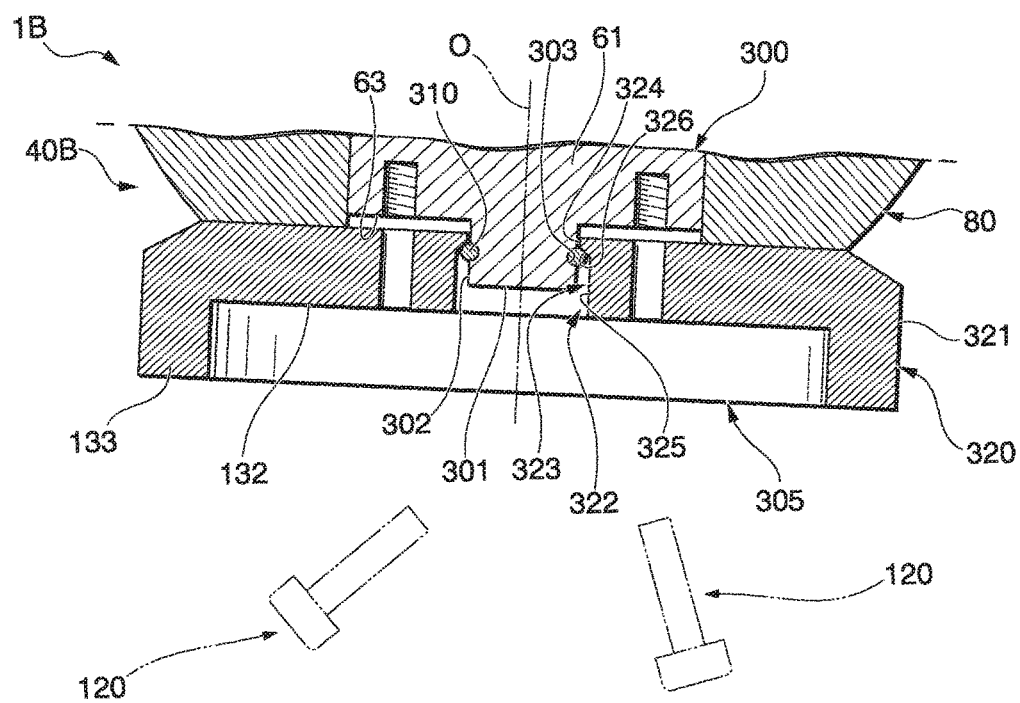
FIG. 11 is a vertical cross-sectional view of the suspension of the dump truck according to the third embodiment of the present invention, as viewed from the front side, and the view showing a state in which a bolt as a fastening member has fallen down.

Next, a third embodiment of the present invention will be described with reference to FIGS. 10 and 11. In the third embodiment, the same reference numerals are given to the same structural elements with the first embodiment and will not be described in detail. A suspension system 40B in a dump truck 1B of the third embodiment is different from the first embodiment in the configuration of a king pin 300 and the holding mechanism 100.

The king pin 300, at a lower end of a king pin body 61 having a columnar shape, has a convex portion 301 protruding downward from the lower end along a reference axis O. The convex portion 301 has a columnar shape with the reference axis O as the center. An outer diameter of an outer peripheral surface 302 of the convex portion 301 is smaller than an outer diameter of an outer peripheral surface of the king pin body 61.

The holding mechanism 100 has a retaining ring 310, a bolt 120, and a holder 320. The retaining ring 310 is an annular member with the reference axis O as the center, and is provided on the outer peripheral surface 302 of the convex portion 301 of the king pin 300. In the present embodiment, in the outer peripheral surface 302 of the convex portion 301, an annular concave portion 303 recessed from the outer peripheral surface and extending annularly with the reference axis O as the center is formed. The retaining ring 310 is integrally fixed to the convex portion 301 in which a portion at an inner peripheral side is fitted to the annular concave portion 303. The retaining ring 310 may be a C-shaped snap ring having a C-letter shape similarly to the snap ring 110 of the first embodiment, may be an E-shaped snap ring, or may be formed of the other shapes. In a state where the retaining ring 310 is attached to the outer peripheral surface 302 of the convex portion 301, the retaining ring 310 protrudes radially outward from the outer peripheral surface 302 of the convex portion 301.

<Holder>

The holder 320 has a holder body 321. The holder body 321 further includes a hole 322 in addition to the configuration of the holder body 130 of the first embodiment. The hole 322 is formed so as to penetrate the holder body 130 along the reference axis O. A cross-sectional shape of an inner peripheral surface 323 of the hole 322 perpendicular to the reference axis O has a round shape with the reference axis O as a center. Within the hole 322, the convex portion 301 of the king pin 300 is inserted from above. In other words, the inner diameter of the hole 322 is greater than the outer diameter of the convex portion 301 of the king pin 300.

The inner peripheral surface 323 of the hole 322 has a lower-part inner peripheral surface 325, an upper-part inner peripheral surface 324.

The lower-part inner peripheral surface 325 is located in a lower part of the hole 322, and is open to the lower surface 132 of the holder body 321. The inner diameter of the lower-part inner peripheral surface 325 is set larger than the outer diameter of the retaining ring 310.

The upper-part inner peripheral surface 324 is located in an upper part of the hole 322, and is open to the upper surface 134 of the holder body 130. The inner diameter of the upper-part inner peripheral surface 324 is larger than the outer diameter of the convex portion 301 of the king pin 300, and is set smaller than the inner diameter of the retaining ring 310.

A step between the lower-part inner peripheral surface 325 and the upper-part inner peripheral surface 324 is a supported surface 326. The supported surface 326 is formed so as to project radially inward from the lower-part inner peripheral surface 325. The supported surface 326 has an annular shape with the reference axis O as a center and is oriented downward. The supported surface 326 is gradually inclined radially inward while directed upward along the reference axis O. That is, the supported surface 326 is a tapered surface reduced in diameter while directed upward along the reference axis O.

In the normal case in which the holder body 321 is attached to the lower end 63 of the king pin 300 by the bolt 120, the upper-part inner peripheral surface 324 of the hole 322 is located above the retaining ring 310 along the reference axis O. The supported surface 326 is separated from the retaining ring 310 in the upward direction along the reference axis O via a space. The supported surface 326 faces the retaining ring 310 from above and along the peripheral direction.

In the present embodiment, for example, when the bolt 120 falls by loosening, the supported surface 326 of the holder body 321 facing and disposed above the retaining ring 310 in the normal case abuts from above with respect to the retaining ring 310.

That is, the falling of the holder body 321 is avoided by the supported surface 326 being supported from below by the retaining ring 310.

As a result, it possible to avoid the spherical bearing 80 and the suspension arm 70 falling out from the king pin 300 and resulting in falling down in the downward direction. Therefore, even when the bolt 120 is fallen down, it is possible to continue the travel of the dump truck 1.

Because, in the normal case, the retaining ring 310 and the supported surface 326 are separated to each other in the direction along the reference axis O, the load from above along the reference axis O is never applied to the retaining ring 310. Therefore, damage such as scar and wear on the snap ring 110 never occurs in the normal case. Thus, when the bolt 120 is fallen down, it is possible to properly support the load from the supported surface 326 of the holder body 321.

Fourth Embodiment

Figure 12:
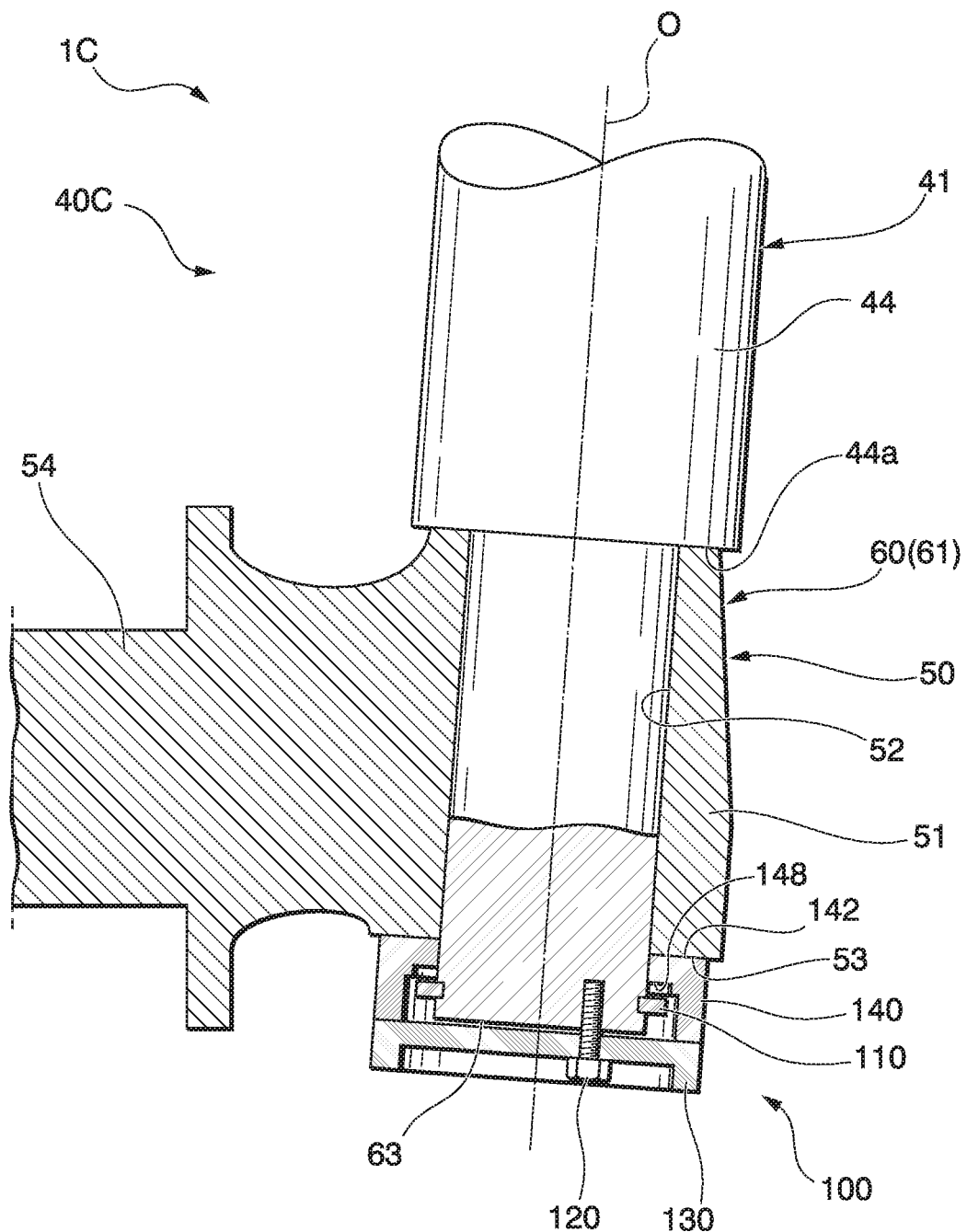
FIG. 12 is a vertical cross-sectional view of a suspension in a dump truck according to the fourth embodiment of the present invention as seen from a front side.

Next, a fourth embodiment of the present invention is described with reference to FIG. 12. In the fourth embodiment, the same reference numerals are given to the same structural elements with the first embodiment and will not be described in detail. A suspension system 40C of a dump truck 1C in the fourth embodiment, a king pin 60 is directly connected to the lower end of a suspension cylinder 41. On the king pin 60, an inner peripheral surface 52 of a base portion 51 of a spindle 50 is externally fitted, and the spindle 50 is rotatable around the reference axis O.

In a lower end 63 of the king pin 60, a holding mechanism 100 similar to the first embodiment is provided. An upper end surface 142 of an annular stopper 140 in the holding mechanism 100 abuts on a lower end surface 53 of a base portion 51 of a spindle 50. As a result, the holding mechanism 100 supports the load of the spindle 50 from below, that is, prevents the spindle 50 from falling down.

Also in the present embodiment, as in the first embodiment, even when a bolt 120 and a holder body 130 fall down, an annular stopper 140 in which a supported surface 148 is supported by a snap ring 110 supports the load of the spindle 50 from below. Therefore, it is possible to prevent the spindle 50 from falling down from the king pin 60. As a result, it is possible to continue traveling of the dump truck 1C.

Other Embodiments

As described in the above, embodiments of the present invention have been described, but the present invention is not limited thereto and can be appropriately changed without departing from the technical idea of the invention.

In each embodiment, the bolt 120 was employed as the fastening member; however, for example, other fastening member such a knock pin may be adopted. That is, if the holder body 130 can be fixed to the king pin 60, it may be employed any fastening member. The fastening member is preferable to detachably fix the holder body 130 against the king pin. As a result, it is possible to improve the maintainability.

Instead of the snap ring 110 of the first, second, and fourth embodiments and the retaining ring 310 of the third embodiment, other ring-shaped member may be employed as a ring. Also, it may be employed a ring formed integrally with the king pin 60. With this arrangement as well, similarly to the embodiments, supported surfaces 148, 326 abuts on the ring thereby it is possible to avoid the falling out of a spherical bearing 80, a suspension arm 70.

Instead of the snap ring 110 and the retaining ring 310, for example, a plurality of pins such as knock pins protruding from the outer peripheral surface 62, 302 of the king pin 60, 300 may be disposed at intervals along the peripheral direction of the king pin. That is, instead of the snap ring 110 and the retaining ring 310, a locking member protruding from the outer peripheral surface of the king pin 60, 300 and disposed along the peripheral direction of the king pin 60, 300 may be employed. With this arrangement as well, similarly to the embodiments, the falling out of the spherical bearing 80 and the suspension arm 70 is possible to avoid by the supported surfaces 148, 326 abutting on the locking member.

The first to third embodiments have been described as a configuration in which the holding mechanism 100 supports the spherical bearing 80 thereby the suspension arm 70 is supported indirectly. Alternatively, a configuration may be adopted in which the suspension arm 70 and the king pin 60 are directly connected with each other without interposing the spherical bearing 80 and the holding mechanism 100 directly supports the suspension arm 70. Also, the suspension arm 70 and the king pin 60 may be rotatably connected with each other via a bearing other than the spherical bearing 80.

The first embodiment has been described a configuration in which the spindle 50 is connected to the cylinder 44 of the suspension cylinder 41; however, the spindle 50 may be connected to other structure other than the suspension cylinder 41 in the suspension device 40.

The first to third embodiments have been described regarding an example in which the king pin 60 is connected to the suspension cylinder 41 via the spindle 50 and the knuckle arm 30; however it is not limited thereto. The king pin 60 may be directly connected to the suspension cylinder 41, or it may be connected via other structure.

In embodiments, an example is described of applying the present invention to each suspension devices 40, 40A, 40B, 40C with which the front wheels 2 of the corresponding dump trucks 1, 1A, 1B, 1C are connected; however, for example, the present invention may be applied to a suspension connected to the rear wheels 3 or it may be applied to a suspension connected to other wheels.

INDUSTRIAL APPLICABILITY

According to the dump truck 1 of the above aspects can be improve the durability.

BRIEF DESCRIPTION OF THE REFERENCE SYMBOLS

1: Dump Truck, 1A: Dump Truck, 1B: Dump Truck, 1C: Dump Truck, 2: Front Wheel, 3: Rear Wheel, 4: Vehicle Body, 5: Cab, 6: Vessel, 6a: Connecting Pin, 6b: Hoist Cylinder, 10: Vehicle-Body Frame, 11: Lower Side Members, 12: Lower Cross Member, 12a: Lower Bracket, 13: Vertical Members, 13a: Upper Bracket, 14: Upper Cross Member, 20: Steering Device, 21: Center Lever, 22: Tie Rod, 23: Steering Cylinder, 30: Knuckle Arm, 31: Base End Portion, 32: Upper End Face, 33: Lower End Surface, 34: Connecting Holes, 35: Inner Peripheral Surface, 40: Suspension, 40A: Suspension, 40B: Suspension, 40C: Suspension, 41: Suspension Cylinder, 42: Cover, 43: Cylinder Connecting Portion, 44: Cylinder, 44a: Lower End Surface, 50: Spindle, 51: Base Portion, 52: Inner Peripheral Surface, 53: Lower End Surface, 54: Shaft Portion, 60: King Pin, 61: King Pin Body, 62: Outer Peripheral Surface, 62a: Groove, 63: Lower End, 63a: Bolt Mounting Hole, 70: Suspension Arm, 71: Front-side Arm Part, 72: Rear-side Arm Part, 73: Arm Connecting Portion, 74: Through Hole, 80: Spherical Bearing, 81: Inner Ring, 82: Inner Peripheral Surface, 83: Upper End Surface, 84: Lower End Surface, 85: Sliding-Contact Outer Peripheral Surface, 86: Outer Ring, 87: Sliding-Contact Inner Peripheral Surface, 88: Outer Peripheral Surface, 100: Holding Mechanism, 110: Snap Ring (Ring, Locking Member), 120: Bolt (Fastening Member), 121: Shaft Portion, 122: Head Portion, 125: Holder, 130: Holder Body, 131: Bolt Insertion Hole, 132: Lower Surface, 133: Edge Portion, 134: Upper Surface, 140: Annular Stopper, 141: Lower End Face, 142: Upper End Face, 143: Inner Peripheral Surface, 144: Fitting Inner Peripheral Surface, 145: First Inner Peripheral Surface, 146: Second Inner Peripheral Surface, 147: Stepped Surface, 148: Supported Surface, 200: Holding Mechanism, 201: Linear Member, 202: Holder-side Concave Portion, 203: Holder-side Convex Portion, 204: Pin-side Concave Portion, 205: Pin-side Convex Portion, 300: King Pin, 301: Convex Portion, 302: Outer Peripheral Surface, 303: Annular Concave Portion, 305: Holding Mechanism, 310: Retaining Ring (Ring, Locking Member), 320: Holder, 321: Holder Body, 322: Hole, 323: Inner Peripheral Surface, 324: Upper-part Inner Peripheral Surface, 325: Lower-part Inner Peripheral Surface, 326: Supported Surface, R: Transport Object, O: Reference Axis, D1: Difference between outer diameter of Snap Ring and inner diameter of First Inner Peripheral Surface, D2: Difference between outer diameter of Snap Ring and inner diameter of Second Inner Peripheral Surface, W: Groove Depth, S1: First Space, S2: Second Space

The invention claimed is:
1. A dump truck comprising:
a vehicle-body frame;
a wheel; and
a suspension supporting the wheel in the vehicle-body frame,
wherein the suspension comprises:
a suspension cylinder swingably connected to an upper part of the vehicle-body frame;
a king pin connected to a lower end of the suspension cylinder and extending further downward from the suspension cylinder;

a suspension arm swingably connected to a lower part of the vehicle-body frame and having a through hole into which the king pin is vertically inserted; and a holding mechanism provided at a lower part of the king pin and holding the suspension arm from below, and wherein the holding mechanism comprises:

a locking member protruding from an outer peripheral surface of the king pin and arranged at a peripheral direction of the king pin;

a fastening member mounted at a lower end of the king pin; and a holder fixed on the king pin by the fastening member and having a supported surface opposed to the locking member from above and along a peripheral direction of the locking member.

2. The dump truck according to claim 1, wherein the supported surface is separated in an upward direction through a space with respect to the locking member.

3. The dump truck according to claim 2, wherein the holder comprises:

a holder body attached to the lower end of the king pin by the fastening member and having an upper surface projected radially outward of the king pin, an annular stopper that has a tubular shape surrounding the king pin from the outer peripheral surface, and that includes a lower end surface abutting on the upper surface of the holder body, an upper end surface supporting the suspension arm from below, and the supported surface.

4. The dump truck according to claim 3, wherein the annular stopper comprises:

a first inner peripheral surface, a first space being defined between the outer peripheral surface of the king pin and the first inner peripheral surface, the first space being opened downward in the annular stopper and accommodating the locking member, a second inner peripheral surface, a second space being defined between the outer peripheral surface of the king pin and the second inner peripheral surface, the second space continuing to an upper side of the first space and an upper end of the second inner peripheral surface being closed by the supported surface, an inner diameter of the second inner peripheral surface is larger than an outer diameter of the locking member, and is smaller than an inner diameter of the first inner peripheral surface.

5. The dump truck according to claim 2, wherein the king pin comprises:

a king pin body connected to the lower end of the suspension cylinder; and a convex portion having an outer diameter smaller than an outer diameter of the king pin body and protruding downward from the lower end of the king pin body, wherein the locking member is provided on an outer peripheral surface of the convex portion, the holder has a hole into which the convex portion enters, the supported surface is formed so as to project radially inward from an inner peripheral surface of the hole.

6. The dump truck according to claim 2, further comprising:

a spherical bearing provided between the outer peripheral surface of the king pin and an inner peripheral surface of the through hole of the suspension arm, and configured to allow a relative rotation between the king pin and the suspension arm, wherein the holder supports the suspension arm via the spherical bearing by supporting the spherical bearing from below.

7. The dump truck according to claim 1, wherein the holder comprises:

a holder body attached to the lower end of the king pin by the fastening member and having an upper surface projected radially outward of the king pin, an annular stopper that has a tubular shape surrounding the king pin from the outer peripheral surface, and that includes a lower end surface abutting on the upper surface of the holder body, an upper end surface supporting the suspension arm from below, and the supported surface.

8. The dump truck according to claim 7, wherein the annular stopper comprises:

a first inner peripheral surface, a first space being defined between the outer peripheral surface of the king pin and the first inner peripheral surface, the first space being opened downward in the annular stopper and accommodating the locking member, a second inner peripheral surface, a second space being defined between the outer peripheral surface of the king pin and the second inner peripheral surface, the second space continuing to an upper side of the first space and an upper end of the second inner peripheral surface being closed by the supported surface, an inner diameter of the second inner peripheral surface is larger than an outer diameter of the locking member, and is smaller than an inner diameter of the first inner peripheral surface.

9. The dump truck according to claim 8, wherein a groove is recessed radially inward and extends along the peripheral direction in the outer peripheral surface of the king pin, the locking member is an annular ring extending in a peripheral direction, part of a radially inward side of the ring is fitted to the groove and the ring is fixed to the king pin, a difference between an outer diameter of the ring and the inner diameter of the first inner peripheral surface is more than a depth of the groove, and a difference between the outer diameter of the ring and the inner diameter of the second inner peripheral surface is smaller the depth of the groove.

10. The dump truck according to claim 9, further comprising:

a linear member, one end of which is connected to the king pin and the other end of which is connected to the holder body, and which is accommodated between the king pin and the holder body in a relaxed state.

11. The dump truck according to claim 9, further comprising:

a spherical bearing provided between the outer peripheral surface of the king pin and an inner peripheral surface of the through hole of the suspension arm, and configured to allow a relative rotation between the king pin and the suspension arm, wherein the holder supports the suspension arm via the spherical bearing by supporting the spherical bearing from below.

12. The dump truck according to claim 8, further comprising:

a linear member, one end of which is connected to the king pin and the other end of which is connected to the holder body, and which is accommodated between the king pin and the holder body in a relaxed state.

13. The dump truck according to claim 8, further comprising:
   a spherical bearing provided between the outer peripheral surface of the king pin and an inner peripheral surface of the through hole of the suspension arm, and configured to allow a relative rotation between the king pin and the suspension arm,
   wherein the holder supports the suspension arm via the spherical bearing by supporting the spherical bearing from below.

14. The dump truck according to claim 7, further comprising:
   a linear member, one end of which is connected to the king pin and the other end of which is connected to the holder body, and which is accommodated between the king pin and the holder body in a relaxed state.

15. The dump truck according to claim 14, further comprising:
   a spherical bearing provided between the outer peripheral surface of the king pin and an inner peripheral surface of the through hole of the suspension arm, and configured to allow a relative rotation between the king pin and the suspension arm,
   wherein the holder supports the suspension arm via the spherical bearing by supporting the spherical bearing from below.

16. The dump truck according to claim 7, further comprising:
   a spherical bearing provided between the outer peripheral surface of the king pin and an inner peripheral surface of the through hole of the suspension arm, and configured to allow a relative rotation between the king pin and the suspension arm,
   wherein the holder supports the suspension arm via the spherical bearing by supporting the spherical bearing from below.

17. The dump truck according to claim 1, wherein the king pin comprises:
   a king pin body connected to the lower end of the suspension cylinder; and
   a convex portion having an outer diameter smaller than an outer diameter of the king pin body and protruding downward from a lower end of the king pin body,
   wherein the locking member is provided on an outer peripheral surface of the convex portion,
   the holder has a hole into which the convex portion enters,
   the supported surface is formed so as to project radially inward from an inner peripheral surface of the hole.

18. The dump truck according to claim 17, further comprising:
   a spherical bearing provided between the outer peripheral surface of the king pin and an inner peripheral surface of the through hole of the suspension arm, and configured to allow a relative rotation between the king pin and the suspension arm,
   wherein the holder supports the suspension arm via the spherical bearing by supporting the spherical bearing from below.

19. The dump truck according to claim 1, further comprising:
   a spherical bearing provided between the outer peripheral surface of the king pin and an inner peripheral surface of the through hole of the suspension arm, and configured to allow a relative rotation between the king pin and the suspension arm,
   wherein the holder supports the suspension arm via the spherical bearing by supporting the spherical bearing from below.

20. A dump truck comprising:
   a vehicle-body frame,
   a wheel, and
   a suspension supporting the wheel in the vehicle-body frame,
   wherein the suspension comprising:
   a suspension cylinder swingably connected at an upper part of the vehicle-body frame,
   a king pin connected to a lower end of the suspension cylinder and extending further downward from the suspension cylinder,
   a spindle supporting the wheel and having a through hole into which the king pin is inserted in the vertical direction, and
   a holding mechanism provided at a lower part of the king pin and supporting the spindle from below, and
   wherein the holding mechanism comprises:
   a ring protruding from an outer peripheral surface of the king pin and extending annularly in a peripheral direction of the king pin,
   a fastening member attached to a lower end of the king pin, and
   a holder fixed on the king pin by the fastening member and having a supported surface opposed to the ring from above and along a peripheral direction of the ring.

* * * * *